United States Patent [19]
Hufnagel et al.

[11] Patent Number: 5,905,134
[45] Date of Patent: May 18, 1999

[54] PROCESS FOR THE PREPARATION OF POLYANHYDRIDES

[75] Inventors: John J. Hufnagel, Waukegan; Ashok V. Bhatia, Libertyville, both of Ill.; David A. Riley, Kenosha, Wis.; Greg E. Robinson, Skokie, Ill.

[73] Assignee: Abbott Laboratories, Abbott Park, Ill.

[21] Appl. No.: 08/832,840

[22] Filed: Apr. 4, 1997

Related U.S. Application Data

[63] Continuation-in-part of application No. 08/633,635, Apr. 17, 1996.

[51] Int. Cl.⁶ .................................................. C08G 63/00
[52] U.S. Cl. ........................ 528/176; 528/193; 528/271; 528/272
[58] Field of Search ................................ 528/176, 193, 528/271, 272

[56] References Cited

U.S. PATENT DOCUMENTS

| | | | |
|---|---|---|---|
| 2,958,678 | 11/1960 | Conix | 528/176 |
| 4,757,128 | 7/1988 | Domb et al. | 528/271 |
| 4,789,724 | 12/1988 | Domb et al. | 528/176 |
| 4,886,870 | 12/1989 | D'Amore et al. | 528/206 |
| 4,906,474 | 3/1990 | Langer et al. | 424/428 |
| 4,916,204 | 4/1990 | Domb et al. | 528/271 |

FOREIGN PATENT DOCUMENTS

| | | |
|---|---|---|
| 840846 | 7/1960 | United Kingdom . |
| 8901005 | 2/1989 | WIPO . |

OTHER PUBLICATIONS

Domb, A. J., et al., "Absorbable Biopolymers Derived from Dimer Fatty Acids", *Journal of Polymer Science: Part A: Polymer Chemistry*, 31:1275–1285 (1993).

Domb, A. J., et al., "Polyanhydrides. I. Preparation of High Molecular Weight Polyanhydrides", *Journal of Polymer Science: Part A: Polymer Chemistry*, 25:3373–3386 (1987).

Yoda, N., et al., "Synthesis of Polyanhydride. I*. Mixed Anhydride of Aromatic and Aliphatic Dibasic Acids", *Central Research Laboratories*, 32(10):1120–1126 (1959).

*Primary Examiner*—Terressa Mosley
*Attorney, Agent, or Firm*—Michael J. Ward

[57] ABSTRACT

Polymers can be prepared in solution by continuously distilling solvent from a solution of diacid prepolymers.

14 Claims, No Drawings

PROCESS FOR THE PREPARATION OF POLYANHYDRIDES

This is a continuation-in-part application of U.S. Ser. No. 08/633,635 filed Apr. 17, 1996.

TECHNICAL FIELD

This invention relates to the synthesis of organic compounds. More particularly, this invention concerns a method of preparation of homopolymers and copolymers of the polyanhydride class.

BACKGROUND OF THE INVENTION

Recently, much research has been done on implantable or injectable drug delivery systems comprising biodegradable polymers and a pharmaceutically active agent. Ideally these systems provide for the controlled release of the active agent while the polymer carrier degrades to non-toxic, soluble monomers, thereby obviating the need for surgical removal of the device. Of these biodegradable polymers, polyanhydrides are particularly attractive because they demonstrate a near zero-order drug release and degrade relatively rapidly in vivo to highly biocompatible monomeric diacids. High molecular weight polyanhydrides are especially useful for biomedical applications because of their superior physico-chemical and mechanical properties including film forming properties and relatively high tensile strength.

High molecular weight polyanhydrides are typically prepared by melt polycondensation in which a mixture of the individually prepared prepolymers are heated at a temperature of about 150–220° C. under a vacuum of about $10^{-4}$ to 1 mm Hg until a polymer having the desired properties is obtained (see U.S. Pat. No. 4,789,724; and Domb, A. J. and Maniar, M. *J. Poly. Sci: Part A*, 1993, 31, 1975). However, the extension of the melt polycondensation method to the pilot plant or commercial production presents a number of problems. The reaction time and temperature necessary for the reaction appear to be dependent on the scale of the reaction, thereby making it difficult to predict reaction conditions. Deviations from the reported reaction conditions may result in polymers having undesirable properties. In addition, the high temperature of the reaction, mixing of the thick molten mass during melt polycondensation, and high vacuum requirement are undesirable. Isolation of the product produced by melt polymerization may be difficult and unsafe.

Moreover, polyanhydrides produced by melt poycondensation techniques which are to be used in implant devices may have higher than desired levels of carboxylic acid anhydride.

It would be beneficial if an alternative to melt polycondensation eliminated problems associated with the use of polyanhydrides made by melt polycondensafion.

SUMMARY OF THE INVENTION

The present invention relates to polyanhydrides that can be prepared by a solution process by continuously distilling solvent from a solution of diacid prepolymers. The present invention provides a process for the preparation of high and low molecular weight polyanhydrides comprising distilling a solvent from a solution of diacid prepolymers. The present invention also describes how a polyanhydride copolymer can be prepared directly from diacid monomers in one processing step.

DETAILED DESCRIPTION

The present invention relates to producing low and high molecular weight polyanhydrides by a solution process. The term "high molecular weight polyanhydrides" refers to polyanhydrides having a molecular weight of greater than 20,000.

The terms "polyanhydride" and "anhydride polymer" both refer to a polymer of general formula I

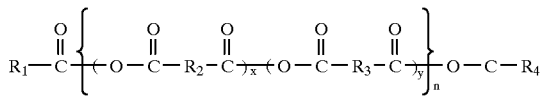

wherein x and y are the molar ratio of diacid prepolymers, n is the degree of polymerization; $R_1$ and $R_4$ are independently selected from alkyl, alkenyl, and alkynyl; $R_2$ and $R_3$ are independently selected from the group consisting of (a) alkylene, (b) phenyl, (c) phenyl substituted with alkyl, halogen, haloalkyl, amino, or alkoxy,

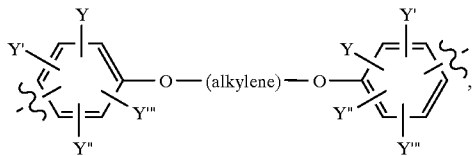

wherein Y, Y', Y", and Y'" are independently selected from the group of hydrogen, alkyl, halogen, haloalkyl, or alkoxy. When $R_2$ and/or $R_3$ is substituent (d), substituent (d) is between two polyanhydride carbonyls, as shown in formula I, and connected to the carbonyls independently in an ortho, meta, or para orientation to the ether linkage (—O—(alkylene)—O—). It is to be understood that the alkylene substituent in substituent (d) may also be alkenylene or alkynylene, and

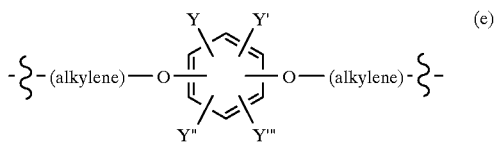

wherein Y, Y', Y", and Y'" is as defined above. When $R_2$ and/or $R_3$ is substituent (e), substituent (e) is between two polyanhydride carbonyls, as shown in formula I, and connected to the carbonyls. It is to be understood that the alkylene substituents in substituent (e) may also independently be alkenylene or alkynylene The term "diacid prepolymers" refers to diacid anhydrides of formula II and III,

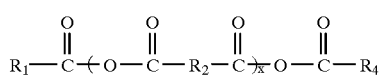

and

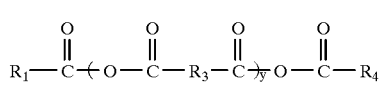

wherein x, y, $R_1$, $R_2$, $R_3$, and $R_4$ are defined above. The diacid prepolymers are prepared by refluxing the corresponding diacid monomer with an excess of carboxylic acid anhydride. Preferred carboxylic acid anhydrides are acetic anhydride and propionic anhydride.

The term "alkyl" refers to straight or branched chain alkyl radicals containing from one to ten carbon atoms including, but not limited to, methyl, ethyl, n- and iso-propyl, n-, sec-, iso- and tert-butyl, and the like.

The term "alkenyl" as used herein refers to a monovalent group derived from a hydrocarbon containing at least one carbon-carbon double bond. Alkenyl groups include, for example, vinyl (ethenyl), allyl (propenyl), butenyl, 1-methyl-2-buten-1-yl and the like.

The term "alkynyl" as used herein refers to a monovalent group derived from a hydrocarbon containing at least one carbon-carbon triple bond. Alkynyl groups include, for example, ethynyl, propynyl, butynyl, 2-butynyl, and the like.

The term "alkylene" denotes a divalent group derived from a straight or branched chain saturated hydrocarbon having from one to fifty carbon atoms by the removal of two hydrogen atoms, for example methylene, 1,2-ethylene, 1,1-ethylene, 1,3-propylene, 2,2-dimethylpropylene, and the like.

The term "alkenylene" denotes a divalent group derived from a straight or branched chain hydrocarbon containing at least one carbon-carbon double bond. Examples of alkenylene include —CH=CH—, —CH$_2$CH=CH—, —C(CH$_3$)=CH—, —CH$_2$CH=CHCH$_2$—, and the like.

The term "alkynylene" refers to a divalent group derived from a straight or branched chain hydrocarbon group containing a carbon-carbon triple bond. Examples of alkynylene include —C≡C—, —C≡C—CH$_2$—, —C≡C—CH(CH$_3$)—, and the like.

The terms "alkoxy" or "alkoxyl" denote an alkyl group as defined above, attached to the parent molecular moiety through an oxygen atom. Representative alkoxy groups include methoxyl, ethoxyl, propoxyl, butoxyl, and the like.

The term "haloalkyl" denotes an alkyl group as defined above, having one, two, or three halogen atoms attached thereto and is exemplified by such groups as chloromethyl, bromoethyl, trifluoromethyl, and the like.

In one embodiment of the present invention, anhydride polymers are prepared by distilling solvent from a solution of diacid prepolymers. The solvent may be continuously distilled until a polymer of the desired characteristics is obtained. Gel Permeation Chromatography (GPC) analysis (or other methods of determination) of an aliquot removed from the reaction mixture may be used to indicate the formation of a desired polyanhydride. The formation of polyanhydrides may be accelerated by the addition of catalysts to the reaction mixture. Catalysts which may be useful with the process of the present invention include catalysts typically used for transesterification, ring-opening polymerizations, and related polymerizations. Representative catalysts include, but are not intended to be limited to, heterogenic coordination catalysts such as Cd(CH$_3$COO)$_2$, alkaline earth metal complexes such as CaO, BaO, and CaCO$_3$, and complexes of diethyl zinc and hydroxylated molecules (see U.S. Pat. No. 4,757,128, hereby fully incorporated by reference).

Solvents may be chosen based on their ability to co-distill with the carboxylic acid anhydride given off in the polymerization reaction. Representative solvents include, but are not intended to be limited to, aromatic and aliphatic hydrocarbons, haloaromatic and haloaliphatic hydrocarbons, and ether based solvents, e.g., diglyme. Particularly preferred solvents are toluene and xylenes. Xylenes include ortho-, meta- and para-xylenes.

Preferred diacid prepolymers include the diacid anhydrides of erucic acid dimer and trimer, sebacic acid, bis(p-carboxyphenoxy)propane (CPP), adipic acid, bis(p-carboxyphenoxy)hexane (CPH), isophthalic acid (IPh), 1,4-phenylenedipropionic acid, and 1,12-dodecanedioic acid. Especially preferred diacid prepolymers are the diacid anhydrides of sebacic acid, bis(p-carboxyphenoxy)propane (CPP), and erucic acid dimer.

Preferred mixtures of diacid prepolymers include a mass ratio of diacid prepolymers from about 10:1 to about 1:10, such as for example, prepolymers of erucic acid dimer and sebacic acid. A more preferred mixture is when mass ratio of diacid prepolymers is about 2:1 to about 1:2. Mass ratio is defined as the ratio of the masses of each diacid prepolymer.

In the solution process of the present invention, polymer may be formed by mixing the prepolymers and heating the mixture in a solvent. The solvent is then distilled to form the polymer. The process may be repeated until a polymer with desired characteristics is obtained.

Substantially all of the solvent may be distilled from the reaction mixture, and the concentrated mixture heated for about 30 to 60 minutes. The mixture may then be cooled and re-dissolved in the solvent. The solvent distillation/heating/cooling process may be continued until a polymer having the desired characteristics is obtained. Further distillations may be done if necessary to remove any residual solvent.

After the last distillation is completed, a solvent may be added to the polymer. The polymer in solvent may then be fine filtered. Fine filtering is meant to include processing the solution containing the reactants and/or products through a filter such as, but not intended to be limited to, membrane and depth filters to remove impurities including insoluble particulates. An advantage of this solution process versus a melt method process is that the polymer solution can be filtered. Fine filtration prior to precipitation may be preferred depending on the intended use of the polyanhydride.

Co-solvents may be used to precipitate out the desired product. Co-solvents suitable with the process of the present invention include, but is not intended to be limited to, heptane, heptane with ethers, especially heptane with methyl tert-butyl ether (MTBE).

Another advantage of this solution process is that the degree of polymerization can be better controlled due to the ease of in-process monitoring. The reaction may be monitored by cooling down the polyanhydride solution, withdrawing a sample, and conducting an appropriate in-process test. Examples of in-process tests include, but are not intended to be limited to, GPC and viscosity analyses. The solution process allows the reaction to be monitored without a substantive change in the product while the in-process testing is being done.

In one embodiment of the present invention, different diacid monomers are individually mixed in a solvent, such as a carboxylic acid anhydride, to produce prepolymers which are isolated separately. The isolated prepolymers may then be mixed together in another solvent to form the polymer of interest.

In yet another embodiment, calculated amounts of diacid monomers may be mixed together and refluxed with an excess of carboxylic acid anhydride. The excess carboxylic acid anhydride is then distilled off and the resulting mixture is dissolved in a solvent and polymerized as described above. The polymer molecular weight may be determined by GPC or another method of determination. The same or different diacid monomers may be used to make the resulting diacid prepolymers. This method is advantageous because it converts a three step process for preparation of a copolymer into a one step process.

It is to be understood that the polymers formed from the solution process of the present invention include homopolymers and copolymers. Homopolymers are polymers formed from a single diacid monomer or diacid prepolymer while copolymers are polymers formed from different diacid monomers or diacid prepolymers.

Yet another advantage of the solution process is that the polyanhydride produced may have a lower amount of residual carboxylic acid anhydride than a polyanhydride manufactured by the melt method. This lower amount of residual carboxylic acid anhydride is important since the polyanhydride may intended for use in an implantable device.

The following Examples are provided for illustration and not intended to limit the scope of the inventive concept.

EXAMPLE 1
Preparation of Erucic Acid Dimer:Sebacic Acid CoPolymer (EAD:SA)

A mixture of sebacic acid prepolymer (161 grams (g)) and erucic acid dimer prepolymer (161 g) in xylenes (300 milliliters (mL)) was heated to reflux temperature and the solvent was distilled under atmospheric pressure. The concentrated mixture was heated at 165° C. for 30–60 minutes. The mixture was cooled and xylenes (300 mL) was added. The process of solvent distillation followed by heating, cooling, and addition of xylenes was repeated until a product having the desired molecular weight, as determined by GPC, was obtained. The reaction mixture was diluted with xylenes to a total volume of 1 liter (L) and filtered through a 10 micron nominal Pyrex® Buchner filter(Thomas Scientific, Swedesboro, N.J.). The resulting solution was added to heptane (3.5 L) with constant stirring. The resulting solid was filtered, washed with heptane, and dried overnight at 35° C. in a vacuum oven to give EAD:SA copolymer (242 g): $M_w$=72,000; $M_n$=18,700. $^1$H NMR (400 MHz, CDCl$_3$) d 0.85 (m, 8H), 1.30 (m, 60H), 1.66 (m, 8H), 2.45 (t, 8H). IR (film) 1813, 1744, 1064, 1043 cm$^{-1}$.

EXAMPLE 2
Large scale Production of EAD:SA Polymer

Sebacic acid prepolymer (7.0 kilograms (kg)) and erucic acid dimer (7.0 kg) prepolymer and xylenes (35.0 kg) were added to a reactor. The reaction mixture was heated and concentrated under atmospheric pressure. After heating the resulting concentrate at 165° C. for 30–60 minutes, the reaction mixture was cooled to 100–120° C. and additional xylenes (35.0 kg) was added. The process of concentration, followed by heating, cooling, and addition of xylenes was repeated until a product having the desired molecular weight was obtained. When the product concentrate displayed the desired molecular weight, xylenes (35.0 kg) was added to the concentrate, and the resulting solution was passed through a cartridge filter (SerFilco SF03U10U, 3 micron nominal pore size) (SerFilco, Northbrook, Ill.) and added to an additional amount of heptane (240 kg). The mixture was stirred for one hour. The contents of the reactor were centrifuged and the cake was washed with heptane. The product was dried under vacuum for two days at 35° C. to afford 9.8 kg of EAD:SA copolymer.

EXAMPLE 3
Synthesis of EAD:SA Copolymer Directly form Monomers

Sebacic acid (94.7 g) and erucic acid dimer (94.7 g) and acetic anhydride (475 mL) were heated to greater than 130° C. for 50 minutes. The mixture was then distilled to distill off the acetic anhydride and form prepolymers under atmospheric pressure. Two additional xylenes (300 mL) were added to the reaction mixture and the mixture was distilled both times under atmospheric pressure. The concentrated mixture was heated at 160–170° C. for 30–60 minutes. The mixture was cooled and xylenes (300 mL) was added. Solvent distillation followed by heating, cooling, and addition of xylenes was repeated until a product possessing the desired molecular weight, as determined by GPC, was obtained. Heptane (1.5 L) was added to the reaction mixture with constant stirring to precipitate the product. The resulting solid was filtered, washed with heptane, and dried overnight at 30° C. in a vacuum oven to give EAD:SA copolymer (151.5 g).

We claim:

1. A process for the preparation of a solution of anhydride polymer having the formula

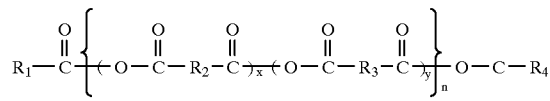

where x and y are each a molar ratio of diacid monomers; n is the degree of polymerization; $R_1$ and $R_4$ are each selected from the group consisting of: alkyl, alkenyl and alkynyl; $R_2$ and $R_3$ are each selected from the group consisting of: alkylene, phenylene, an alkyl substituted phenyl, halogen, haloalkyl, amino, alkoxy,

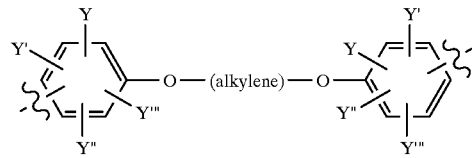

where Y, Y', Y" and Y'" are each selected from the group consisting of: hydrogen, alkyl, halogen, haloalkyl and alkoxy; and

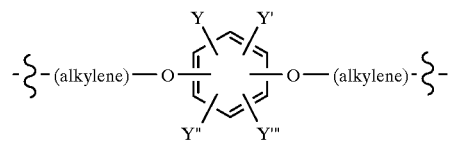

where Y, Y', Y" and Y'" are each selected from the group consisting of: hydrogen, alkyl, halogen, haloalkyl and alkoxy; the process comprising the steps of:

a) refluxing a mixture of at least one diacid monomer with at least one carboxylic acid anhydride;

b) adding a solvent to the mixture; and c) distilling the solvent from the mixture to form the anhydride polymer.

2. A process of claim 1 further comprising adding additional solvent and then distilling said solvent.

3. A process of claim 1 wherein said carboxylic acid anhydride is selected from the group of acetic anhydride and propionic anhydride.

4. A process of claim 1 wherein a co-solvent is added to precipitate said polymer.

5. A process of claim 1 wherein the solvent is selected from the group consisting of: aromatic and aliphatic hydrocarbons, haloaromatic and haloaliphatic hydrocarbons, and ether based solvents.

6. A process of claim 1 wherein said solvents are toluene and xylenes.

7. A process of claim 1 wherein said diacid monomer is selected from the group of erucic acid dimer and trimer, sebacic acid, bis(p-carboxyphenoxy)propane (CPP), adipic acid, bis(p-carboxyphenoxy)hexane (CPH), isophthalic acid (IPh), 1,4-phenylenedipropionic acid, and 1,12-dodecanedioic acid.

8. A process of claim 1 wherein the mass ratio of diacid monomers is from about 10:1 to about 1:10.

9. A process of claim 8 wherein the mass ratio of diacid monomers is about 2:1 to about 1:2.

10. A process of claim 1 further comprising adding a catalyst to the reaction mixture.

11. A process of claim 10 wherein said catalyst is selected from the group consisting of heterogenic coordination catalysts, alkaline earth metal complexes, and complexes of diethyl zinc and hydroxylated molecules.

12. A process of claim 1 wherein said solution of polymer anhydrides is fine filtered.

13. A process of claim 4 wherein said co-solvents is selected from heptane, heptane with ethers, and heptane with methyl tert-butyl ether (MTBE).

14. A process for the preparation of a erucic acid dimer:sebacic acid polymer, the process comprising the steps of:

a) dissolving predetermined quantities of erucic acid dimer monomer and sebacic acid monomer in a solvent;

b) distilling the solvent under atmospheric pressure; and c) isolating the erucic acid dimer:sebacic acid polymer.

\* \* \* \* \*

UNITED STATES PATENT AND TRADEMARK OFFICE
CERTIFICATE OF CORRECTION

PATENT NO. : 5,905,134
DATED : May 18, 1999
INVENTOR(S) : John J. Hufnagel et al.

It is certified that error appears in the above-identified patent and that said Letters Patent is hereby corrected as shown below:

Col. 2, line 18
  replace " "
  with --(d)--.

Signed and Sealed this

Sixth Day of June, 2000

Attest:

Q. TODD DICKINSON

*Attesting Officer*    *Director of Patents and Trademarks*